(12) United States Patent
Gorski et al.

(10) Patent No.: US 6,349,571 B1
(45) Date of Patent: Feb. 26, 2002

(54) PUSHOUT MECHANISM FOR I.S. MACHINE

(75) Inventors: Richard A. Gorski, West Suffield;
Gary R. Voisine, East Hartford, both of CT (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/500,587

(22) Filed: Feb. 10, 2000

(51) Int. Cl.[7] .................................................. C03B 9/453
(52) U.S. Cl. ........................... 65/260; 65/239; 65/241; 65/375; 198/468.01; 294/64.3; 414/744.4; 414/744.6
(58) Field of Search ................................ 65/29.11, 159, 65/160, 227, 239, 241, 260, 375; 198/468.01, 493; 294/64.3; 414/744.4, 744.6

(56) References Cited

U.S. PATENT DOCUMENTS

| | | | | |
|---|---|---|---|---|
| 4,502,721 A | * | 3/1985 | Savin-Czeizler et al. | .... 294/1.1 |
| 4,927,444 A | * | 5/1990 | Voisine | ......................... 65/323 |
| 5,066,058 A | * | 11/1991 | Guyard | ....................... 294/1.1 |
| 5,429,651 A | * | 7/1995 | Bolin | ........................... 65/241 |
| 5,527,372 A | * | 6/1996 | Voisine et al. | ................. 65/260 |
| 5,733,354 A | * | 3/1998 | Voisine et al. | ................. 65/260 |

\* cited by examiner

*Primary Examiner*—Sean Vincent
(74) *Attorney, Agent, or Firm*—Spencer T. Smith

(57) ABSTRACT

A pushout mechanism is disclosed for transferring bottles from a deadplate of an I.S. machine section to a conveyor. The pushout mechanism has a finger assembly including inner and outer pockets and is pivotally displaced, when the finger assembly is at an advanced position, from the deadplate and to a conveyor. Each of the inner and outer pockets includes an air directing structure such as a jet for directing air to hold a bottle located within the pocket against the pocket. A first pressurized air supply which includes a first control valve supplies pressurized air to the air directing structure of the inner pocket and a second pressurized air supply means including a second control valve for supplies pressurized air to the air directing structure of the outer pocket. A control opens the first and second control structures when the finger assembly is located over the deadplate and turns off the first and second control structures when the bottle in the respective pocket reaches the bottle center line on the conveyor.

4 Claims, 2 Drawing Sheets

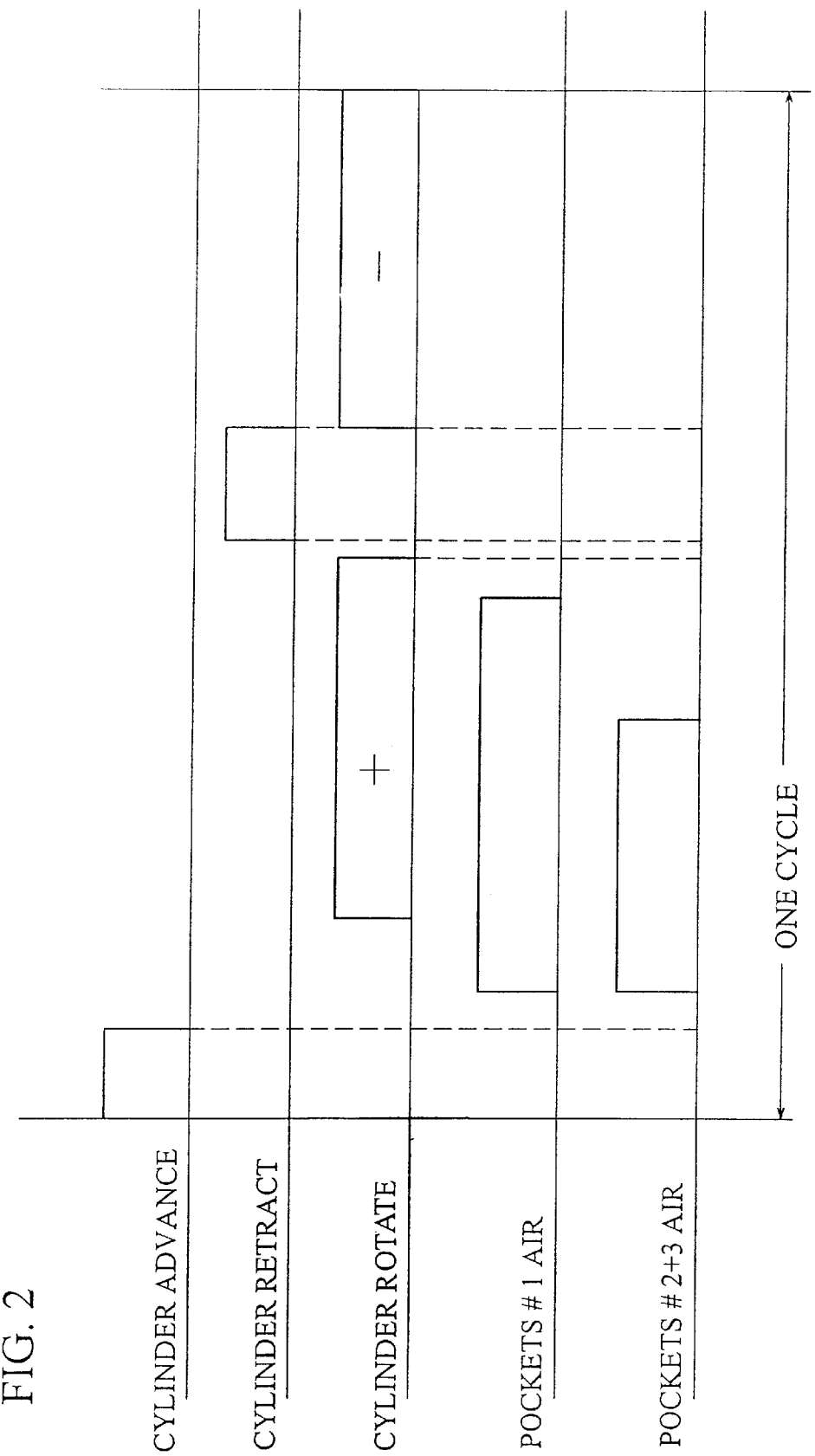

PUSHOUT MECHANISM FOR I.S. MACHINE

SPECIFICATION

The present invention relates to I.S. (individual section) machines for forming bottles from gobs of molten glass and more specifically to a pushout mechanism, which will be used in each individual section.

BACKGROUND OF THE INVENTION

Following the formation of a bottle in the blow station of a section of an I.S. machine, blow molds separate to release the formed bottle and a takeout device transfers the bottle to a deadplate where the bottle momentarily sits while it is cooled by air which flows up through holes in the deadplate. After it has been sufficiently cooled, a pushout mechanism pushes the bottle in a 90° arc off of the deadplate onto a moving conveyor.

U.S Pat. Nos. 5,733,354 and 5,527,372 disclose a state of the art pushout mechanism. In the disclosed pushout mechanism, which includes an arm defining three pockets, three bottles are transferred from a deadplate to the moving conveyor. Each bottle is captured by an associated pocket, which has a rear wall or finger, and air is jetted from each of the three associated fingers to hold a bottle against each pocket. In operation, pressurized air is supplied to an air cylinder, to which the arm is attached, to advance the arm from a retracted position to an advanced position over the deadplate and this cylinder advance air is simultaneously and concurrently supplied to the conduits leading to openings in each finger which are designed to jet the air outwardly. When the pockets have been displaced to a location where the first bottle is located on the bottle centerline of the conveyor, the cylinder advance air (and hence the jetted air) is turned off. When the rotation of the pushout is completed, cylinder retract air is turned on to retract the arm to a remote position so that it can be rotated displaced back to its start position.

OBJECT OF THE INVENTION

It is an object of the present invention to provide a pushout mechanism, which will provide the ability to better control the transfer of the bottle to the conveyor.

Other objects and advantages of the present invention will become apparent from the following portion of this specification ad from the accompanying drawings, which illustrate in accordance with the mandate of the patent statutes a presently preferred embodiment incorporating the principles of the invention.

BRIEF DESCRIPTION OF THE DRAWINGS

FIG. 2 is a timing chart illustrating one mode for operating the pushout mechanism shown in FIG. 1.

BRIEF DESCRIPTION OF THE PREFERRED EMBODIMENT

Figure 1:
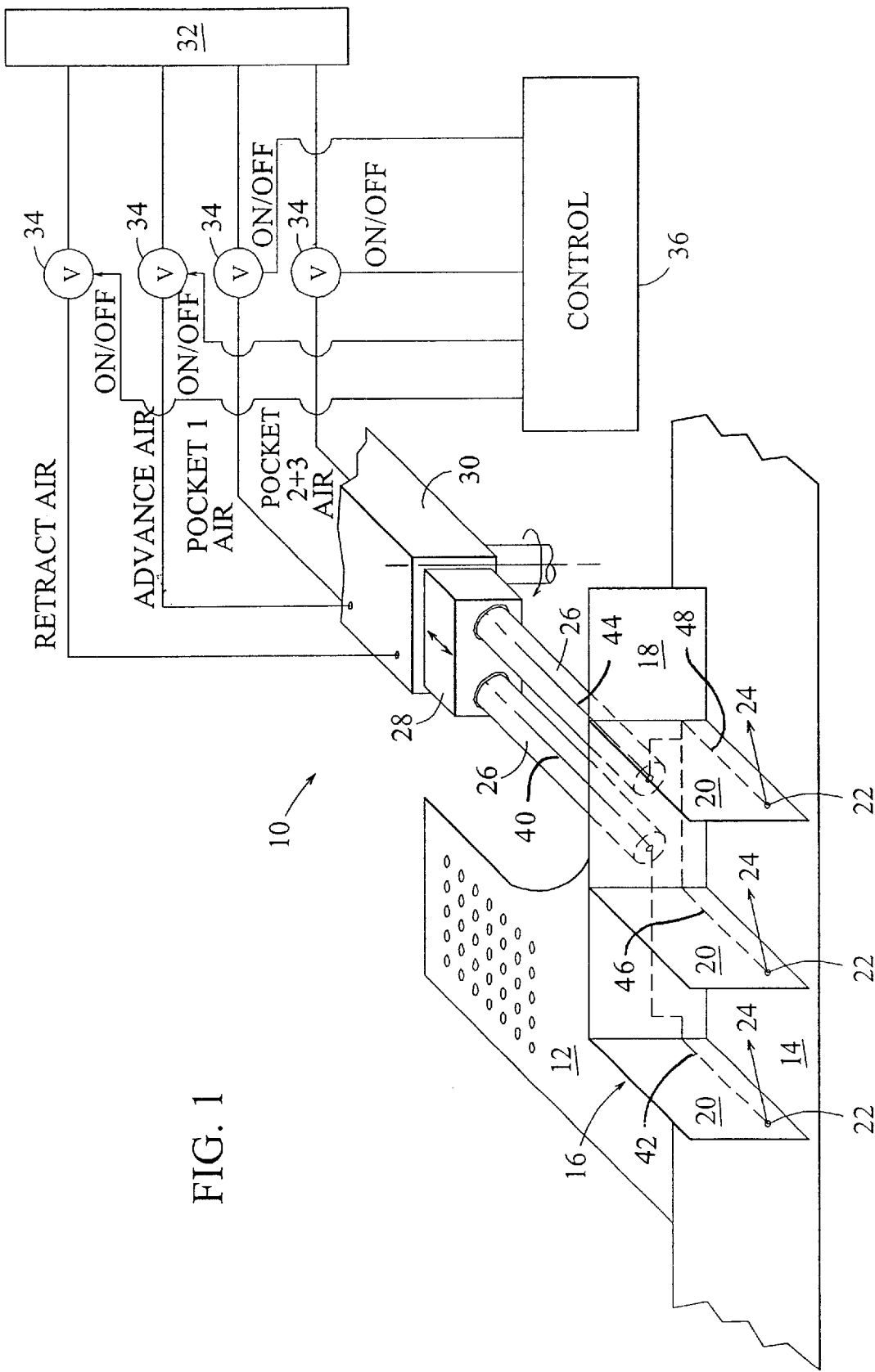
FIG. 1 is a schematic drawing of a pushout mechanism made in accordance with the teachings of the present invention.

A pushout mechanism 10 is used to push glass bottles (not shown), formed in a section of an I.S. machine, from a deadplate 12 onto a conveyor 14. The pushout mechanism has a finger assembly 16 defined by a side wall 18 and fingers 20 which extend perpendicular to the side wall to define bottle receiving pockets. As shown, the pushout is configured for triple gob operation and accordingly has three bottle receiving pockets. Pocket No.1, is the rearmost (the pocket at the left end) and pockets numbered 2 and 3 are the next successive pockets. Each finger, proximate its lower outside corner has a formed exit port 22 so that pressurized air can be jetted 24 to pull a bottle into its associated corner. The sidewall 18 is attached to a pair of rods 26 integral with a piston 28 displaceable within a pneumatic cylinder 30. The pneumatic cylinder is mounted for rotation about a vertical axis from a pickup location at the deadplate to a deposit location at the conveyor. The rods are axially displaceable between a retracted position remote from the bottles to an advanced position.

As can be seen from FIG. 1, there are four air lines from a source of pressurized air 32 (while a common source is illustrated, discrete sources could be provided so that different pressures would be available). Passage of air through each air line is controlled by a suitable on/off valve 34 which will be operated by a control 36. Retract air and advance air will advance the piston to the deadplate and retract air will retract the piston from the conveyor. Pocket #1 Air will be delivered through a suitable conduit 40 in one of the rods to a conduit 42 in the finger assembly which communicates with the jet in the first pocket finger. Pocket #2&3 Air will be delivered through a suitable conduit 44 in the other one of the rods to a conduit 46 in the finger assembly which communicates with the jet in the second pocket and to a conduit 48 in the finger assembly which communicates with the jet in the third pocket finger. The jetted air pulls bottles located in the associated pockets into the corner of the pockets.

FIG. 2 illustrates a cycle of operation for the pushout mechanism. At the beginning of the cycle, the cylinder is retracted and is located proximate the deadplate. Pocket air to pockets 1, 2 and 3 is off. Three bottles, that have been released by the blow molds of a section, will be gripped by a takeout (not shown) and transferred to a position over the deadplate where they will be held momentarily a very short distance above the deadplate while cooling air blows upwardly through the holes in the deadplate. When the bottles have been cooled sufficiently, the bottles are released and drop onto the deadplate. At about this same time, Cylinder Advance Air is turned on to advance the cylinder, and hence the finger assembly, to an advanced location over the deadplate with a bottle located centrally in each pocket. After the finger assembly has been displaced to the advanced position, Pocket Air #1 and Pocket Air #2&3 are turned on to pull the bottles into firm engagement with the corners of the pockets and then the cylinder is rotated (usually with an electronic motor which displaces the finger assembly in accordance with a desired profile) to the deposit location where the bottles are over the conveyor. As can be seen from this timing chart, Pocket Air #2&3 is turned off before Pocket Air #1 and while the cylinder is rotating to the final deposit location. The time when Pocket Air #2&3 is turned off is set to correspond to the time when the bottle in pocket number 3 (the outer pocket) has reached the bottle center line on the conveyor. The bottle in pocket number 2, will accordingly be released just prior to its displacement to the bottle center line. The time when Pocket Air #1 is turned off is set to correspond to the time when the bottle in pocket number 1 (the inner pocket) has reached the bottle center line on the conveyor. While in the disclosed embodiment, pocket air is turned off as a function of the location of a bottle at the bottle center line, other control times could be applied.

Shortly thereafter, rotation of the cylinder is completed, cylinder retract air is turned on to retract the cylinder to the retracted position, and then the cylinder is rotated back from the conveyor to the deadplate.

What is claimed is:

1. A pushout mechanism for transferring bottles from a deadplate of an I.S. machine section to a conveyor having a finger assembly including inner and outer pockets and pivotally mounted motor means secured to the finger assembly for linearly displacing the finger assembly between retracted and advanced positions and rotatively displacing the finger assembly between deadplate and conveyor positions so that bottles deposited on a deadplate can be transferred by rotating an advanced finger assembly from the deadplate position to the conveyor location, to the conveyor with the axis of each bottle on the bottle center line of the conveyor, comprising each of said inner and outer pockets including air directing means for directing air to hold a bottle located within the pocket against the pocket, first pressurized air supply means including a first control valve for supplying pressurized air to the air directing means of the inner pocket, second pressurized air supply means including a second control valve for supplying pressurized air to the air directing means of the outer pocket, and control means for opening said first control value when the outer pocket is located over the deadplate and turning off said first control value at a first time when the bottle in the outer pocket is on the conveyor, and for opening said second control value when the inner pocket is located over the deadplate and turning off said second control value at a second time when the bottle in the inner pocket is on the conveyor.

2. A pushout mechanism according to claim 1, wherein said first time corresponds to the time when the bottle in the outer pocket reaches the conveyor bottle center line and wherein said second time corresponds to the time when the bottle in the inner pocket reaches the conveyor bottle center line.

3. A pushout mechanism according to claim 1, wherein said finger assembly comprises inner, center and outer pockets, said center pocket includes air directing means for directing air to hold a bottle located within the center pocket against the center pocket, and second pressurized air supply means further comprises means for supplying pressurized air to the air directing means of the center pocket.

4. A pushout mechanism according to claim 1, wherein the pressurized air supplied to said inner and outer pockets has the same pressure.

* * * * *